T. PAYNE.
Meat Chopper.
No. 81,939.
Patented Sept. 8, 1868.
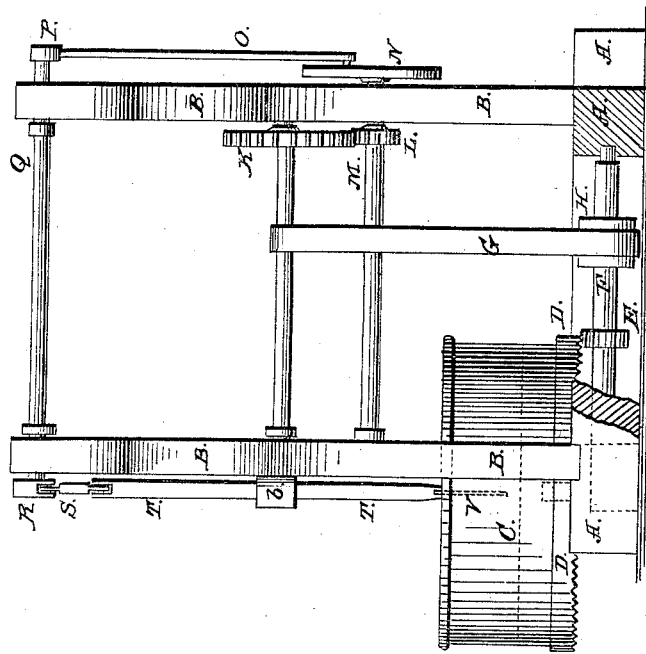
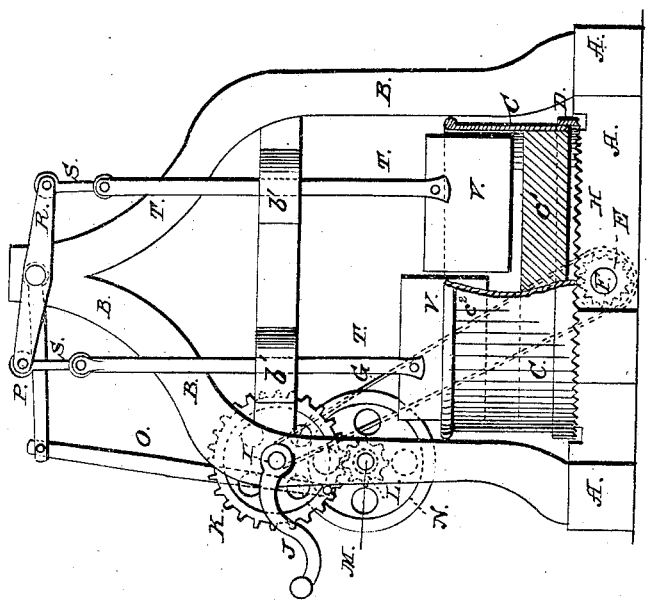

United States Patent Office.

THOMAS PAYNE, OF GRAND RAPIDS, MICHIGAN.

Letters Patent No. 81,939, dated September 8, 1868.

IMPROVED MEAT-CHOPPER.

*The Schedule referred to in these Letters Patent and making part of the same.*

TO ALL WHOM IT MAY CONCERN:

Be it known that I, THOMAS PAYNE, of Grand Rapids, in the county of Kent, and State of Michigan, have invented a new and useful Improvement in Meat-Choppers; and I do hereby declare that the following is a full, clear, and exact description thereof, which will enable others skilled in the art to make and use the same, reference being had to the accompanying drawings, forming part of this specification, in which—

Figure 1 is a front view of my improved machine, part of the chopping-box being broken away.

Figure 2 is a side view of the same, part of the base-frame being broken away.

Similar letters of reference indicate corresponding parts.

My invention has for its object to furnish a simple, convenient, and effective machine for chopping sausage-meat and other substances, which shall be so constructed and arranged that the chopping-box may be revolved automatically, with a slow and steady movement, bringing a new part of the substance being chopped beneath the knives at each stroke.

It consists in the construction and combination of the various parts, as hereinafter more fully described.

A is the base-frame of the machine, to the end parts of which are securely attached the lower ends of the two vertical end-frames B.

C is the chopping-box, consisting of a circular block, $c^1$, surrounded by a band or hoop, $c^2$, projecting above the upper surface of the block $c^1$, so as to form a receptacle of sufficient depth to receive the substance to be chopped.

The block $c^1$ has a socket formed in the centre of its lower side, into which enters a pivoting-pin, attached to the base-frame A, so as to pivot the said box to the said frame.

D is a circular rack, attached to the lower edge of the sides, or to the bottom of the chopping-box C, and into the teeth of which mesh the teeth of the gear or pinion-wheel E, attached to the shaft F, which revolves in bearings in the base-frame A, and to which motion is given by the band G, which passes around the pulley H, attached to said shaft F, and around the crank-shaft I.

The shaft I revolves in bearings in the vertical frame B, and to one of its ends is attached the crank J, by means of which the machine is operated. To the shaft I is attached a large gear-wheel, K, the teeth of which mesh into the teeth of the small gear-wheel L, attached to the shaft M, which revolves in bearings in the vertical frames B, and to one end of which is attached a crank-wheel, N, which is made heavy, so as at the same time to serve as a fly-wheel.

To the crank-pin of the wheel N is pivoted one end of the pitman O, the other end of which is pivoted to the end of the arm P. The other end of the arm P is rigidly attached to the end of the shaft Q, which revolves in bearings in the upper parts of the vertical frame B. To the other end of the rack-shaft Q is attached a cross-head, R, to the ends of which are pivoted the upper ends of the two short connecting-rods S, to the lower ends of which are pivoted the upper ends of the two knife-shanks or stems T, which work up and down vertically, through guides $b'$, attached to the frame B, as the shaft Q rocks.

To the lower ends of the stems T are attached the knives U, which act alternately upon the meat or other substance in the box C, as the said box slowly revolves beneath them.

Having thus described my invention, I claim as new, and desire to secure by Letters Patent—

The combination of the crank-shaft I, gear-wheels K and L, shaft M, crank-wheel N, pitman O, arm P, rack-shaft Q, cross-head R, short connecting-rods S, stems T, and knives U, with each other and with the frames B and revolving chopping-box C, substantially as herein shown and described, and for the purpose set forth.

THOMAS PAYNE.

Witnesses:
CHAS. SHEPARD,
ALFRED PUTNAM.